United States Patent
Koike et al.

(10) Patent No.: US 7,486,646 B2
(45) Date of Patent: Feb. 3, 2009

(54) RADIO BASE SYSTEM AND TRANSMISSION TIMING CONTROL METHOD

(75) Inventors: Hirotaka Koike, Higashiosaka (JP); Takeo Miyata, Gifu (JP); Yoshiharu Doi, Gifu (JP); Seigo Nakao, Gifu (JP); Masashi Iwami, Gifu (JP); Jun Kitakado, Hashima (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1020 days.

(21) Appl. No.: 10/380,635

(22) PCT Filed: Aug. 27, 2001

(86) PCT No.: PCT/JP01/07332

§ 371 (c)(1),
(2), (4) Date: Mar. 21, 2003

(87) PCT Pub. No.: WO02/25978

PCT Pub. Date: Mar. 28, 2002

(65) Prior Publication Data

US 2004/0004946 A1     Jan. 8, 2004

(30) Foreign Application Priority Data

Sep. 22, 2000   (JP)  ............................ 2000-287872

(51) Int. Cl.
*H04J 3/00*     (2006.01)
(52) U.S. Cl. ........................ 370/337; 370/442; 370/310; 370/347; 370/350; 455/509; 455/464; 455/522

(58) Field of Classification Search ................ 320/332, 320/442, 458, 395.4; 455/509, 464, 510, 455/522; 370/337, 442, 310, 347, 350
See application file for complete search history.

(56) References Cited

U.S. PATENT DOCUMENTS 5,844,900 A * 12/1998 Hong et al. .................. 370/342

(Continued)

FOREIGN PATENT DOCUMENTS

JP     2000-106696     4/2000

OTHER PUBLICATIONS

Hiroshi Suzuki et al.; The Institute of Electronics Information and Communication Engineers, Technical Report of IEICE. RCS93-84, pp. 37-44, Jan. 1994, Cited in the int'l search report.

*Primary Examiner*—David Q Nguyen
(74) *Attorney, Agent, or Firm*—Westerman, Hattori, Daniels & Adrian, LLP.

(57) ABSTRACT

A slot of a low multiplicity is processed to narrow transmission timing intervals for already-connected users and thereby to make preparation for a new user, and a slot of a high multiplicity is processed to keep the maximum transmission timing intervals for the already-connected users so that the preparation for the new user is not performed. As a result, it is possible to provide the slot prepared for the new user while maximizing the transmission timing intervals. Further, the transmission timing intervals for the already-connected users are kept as large as possible during the traffic channel for preventing the deterioration of characteristics, and the shifting of the transmission timing is performed for the new user during the control channel so that the optimum transmission timing intervals can be achieved when the traffic channel is established. A DSP (14) executes the processing.

12 Claims, 8 Drawing Sheets

U.S. PATENT DOCUMENTS

| | | | | |
|---|---|---|---|---|
| 6,041,237 A * | 3/2000 | Farsakh | ............... | 455/450 |
| 6,466,557 B1 * | 10/2002 | Doi | ............... | 370/332 |
| 6,647,271 B1 * | 11/2003 | Doi | ............... | 455/464 |
| 6,671,516 B1 * | 12/2003 | Doi | ............... | 455/509 |
| 7,177,346 B1 * | 2/2007 | Doi | ............... | 375/148 |
| 2004/0066796 A1 * | 4/2004 | Nakao et al. | ............... | 370/458 |

* cited by examiner

USER DISTRIBUTION IN SLOTS AND TRANSMISSION TIMING CONTROL

| | NO-MULTIPLEXED SLOT | ONE-MULTIPLEXED SLOT | TWO-MULTIPLEXED SLOT | THREE-MULTIPLEXED SLOT | FOUR-MULTIPLEXED SLOT |
|---|---|---|---|---|---|
| LESS THAN 5 USERS IN 3 SLOTS | — — — | — — — | TOP — — END | TOP — TOP+(MAX/2) END | TOP TOP+(MAX/3) TOP+(2*MAX/3) END |
| (5 OR MORE USERS IN 3 SLOTS) AND (LESS THAN 8 USERS IN 3 SLOTS) AND (EMPTY SLOT AVAILABLE) | — — — | — — — END | TOP — — END | TOP — TOP+(MAX/2) END | TOP TOP+(MAX/3) TOP+(2*MAX/3) END |
| (5 OR MORE USERS IN 3 SLOTS) AND (LESS THAN 8 USERS IN 3 SLOTS) AND (NO EMPTY SLOT AVAILABLE) | — — — | — — — END | — TOP+(MAX/2) END | — TOP+(MAX/2) END | TOP TOP+(MAX/3) TOP+(2*MAX/3) END |
| (8 OR MORE USERS IN 3 SLOTS) AND (ONE OR LESS MULTIPLEXED SLOT AVAILABLE) | — — — | — — — END | — TOP+(MAX/2) END | TOP — TOP+(MAX/2) END | TOP TOP+(MAX/3) TOP+(2*MAX/3) END |
| (8 OR MORE USERS IN 3 SLOTS) AND (ONE OR LESS MULTIPLEXED SLOT NOT AVAILABLE) | — — — | — — — END | — TOP+(MAX/2) END | TOP+(MAX/3) TOP+(2*MAX/3) END | TOP TOP+(MAX/3) TOP+(2*MAX/3) END |

RADIO BASE SYSTEM AND TRANSMISSION TIMING CONTROL METHOD

TECHNICAL FIELD

The present invention relates a radio base station system and a transmission timing control method, and particularly to a radio base station system, which allows path division multiple connection by a plurality of mobile terminal devices in a mobile communication system, as well as a transmission timing control method for providing appropriate timing in such a radio base station system for receiving signals from a mobile terminal device, and also providing appropriate timing in the mobile terminal device for receiving signals from the radio base station system.

BACKGROUND ART

In recent years, mobile communication systems such as a Personal Handyphone System, which will be referred to as a "PHS" hereinafter, have been rapidly developed, and a PDMA (Path Division Multiple Access) method has been proposed for such mobile communication system. According to the PDMA method, one time slot of a single frequency is spatially divided so that mobile terminal devices of a plurality of users can be connected in a path division multiple manner to the radio base station system. In this PDMA method, a signal transmitted from the mobile terminal device of each user is separated and extracted by known adaptive array processing.

In the mobile communication system of the above PDMA type, a reception timing at which a signal transmitted from each mobile terminal device arrives at the radio base station (also referred to as a synchronization position) varies due to various factors such as changes in distance between a moving terminal device and the base station, and variations in propagation path characteristics of radio waves.

According to the mobile communication system of the PDMA type, the mobile terminal devices of a plurality of users may be connected in the path division multiple manner in the same time slot. In this state, the reception timing of the signal received from each mobile terminal device may vary due to the foregoing reasons so that the signal reception timing thereof may become close to that of another device. In some cases, the signal receiving order of the plurality of devices may be inverted.

If the reception timing becomes excessively close to anther, this increases a correlation value between the signals received from the plurality of mobile terminal devices, and lowers an accuracy of signal extraction for each user by the adaptive array processing. Therefore, the conversation characteristics for each user deteriorate.

In the PHS, a signal received from each mobile terminal device contains a reference signal section, which is formed of a known bit string common to respective users, in each frame. Therefore, if the signals are received from the mobile terminal devices of the plurality of users at the same reception timing, the reference signal sections of the received signals overlap with each other so that each user cannot be identified, and cross talk (so-called "SWAP") occurs between the users.

Accordingly, the reception timings of the mobile terminal devices of the plurality of users, which are connected in the path division multiple manner in the same time slot, must be controlled to prevent such situations that the signal reception timing becomes close to that of another device, and that the signal receiving order of the plurality of devices is inverted.

For controlling the reception timing of signal received from the mobile terminal devices, it is effective to control the transmission timing for transmitting signals from the radio base station system to the mobile terminal devices.

By controlling the transmission timing for each user, the reception timing for each user can be controlled for the following reasons.

In the mobile communication system such as a PHS, the timing for transmitting and receiving signals between the radio base station system and the mobile terminal devices is determined according to the standards such that the mobile terminal device transmits a signal to the radio base station system after a predetermined time from reception of a signal from the radio base station system.

If the radio base station system shifts the signal transmission timing for each user from that of the other users, the timing of signal reception by the corresponding mobile terminal device is shifted from that of the others. Therefore, the timing for transmitting the signal from each mobile terminal device to the radio base station system shifts from that of the other mobile terminal devices.

As a result, the radio base station system receives the signal from each mobile terminal device at the timing shifted from the reception timing of the others.

As described above, by controlling the signal transmission timing of each mobile terminal device in the radio base station system, it is possible to control indirectly the timing for receiving the signal from each mobile terminal device by the radio base station system, and thereby the reception timing can be controlled to provide a longer reception timing interval with respect to the other.

In the mobile communication system of the PDMA type, however, if the number of users connecting in the multiple manner in each time slot increases, and thus if the path multiplicity increases, the transmission timing intervals in each slot inevitably decrease so that the receiving operations may be performed at reduced intervals or in an inverted sequence. In these cases, the conversation characteristics may deteriorate, or crosstalk may occur between user's devices.

Accordingly, an object of the invention is to provide a radio base station system and a transmission timing control method, which can maximize transmission timing intervals for a plurality of user's mobile terminal devices connecting in the path division multiple manner in the same time slot, and thereby can suppress deterioration of conversation characteristics and crosstalk between the users.

DISCLOSURE OF THE INVENTION

According to the invention, a radio base station system for allowing path division multiple connection of a plurality of mobile terminal devices, and operating to transmit and receive signals to and from the plurality of mobile terminal devices on a basis of a plurality of slots, includes a measuring portion and a transmission timing control portion. The measuring portion measures the number of the mobile terminal devices connected in each of the plurality of slots. The transmission timing control portion operates, for the slot used for the path division multiple connection of a predetermined number or more of the mobile terminal devices, to control transmission timings for the mobile terminal devices connecting in the path division multiple manner within a section allowing the transmission timing setting in the slot and thereby to maximize transmission timing intervals for the mobile terminal devices connecting in the path division multiple manner in the slot; and operates, for the slot used for the path division multiple connection of the mobile terminal devices fewer than the predetermined number, to control the transmission timing for the mobile terminal devices connecting in the path division multiple manner in the slot to ensure a section for assigning the transmission timing for a new mobile terminal device within the section allowing the transmission timing setting in the slot, and to assign the transmission timing for the new mobile terminal device requesting the connection to the ensured section.

Preferably, the transmission timing control portion controls the transmission timing for the mobile terminal devices connecting in the path division multiple manner to configure the slot used for the path division multiple connection of the mobile terminal devices fewer than the predetermined number such that a leading region in the section allowing the transmission timing setting in the slot is always used as a section for assigning the transmission timing for a new mobile terminal device.

Preferably, the transmission timing control portion rejects the assignment of the transmission timing for a new mobile terminal device when the new mobile terminal device requests connection during a period of controlling the transmission timing to ensure a section for assigning the transmission timing.

Preferably, when any one of the mobile terminal devices is disconnected in the slot used for the path division multiple connection of the predetermined number or more of the mobile terminal devices, the transmission timing control portion controls the transmission timing for the remaining mobile terminal devices still connecting in the path division multiple manner to provide the maximum transmission timing intervals for the remaining mobile terminal devices.

Preferably, the predetermined number is determined in accordance with a total number of the mobile terminal devices connected in all of the plurality of slots.

Preferably, the transmission timing control portion stops the control of the transmission timing performed for ensuring the section for assigning the transmission timing when the predetermined number changes.

According to another aspect of the invention, a radio base station system for allowing path division multiple connection of a plurality of mobile terminal devices, and operating to transmit and receive signals to and from the plurality of mobile terminal devices on a basis of a plurality of slots, includes a measuring portion and a transmission timing control portion. The measuring portion measures the number of the mobile terminal devices connected in each of the plurality of slots. The transmission timing control portion controls, within a section allowing transmission timing setting in each of the slots, transmission timing for the mobile terminal devices connecting in the path division multiple manner to maximize transmission timing intervals for the mobile terminal devices connecting in the path division multiple manner in the slot; and assigns the transmission timing for a new terminal device requesting connection to the slot during a period of communication of the radio base station system to the mobile terminal device over a control channel.

Preferably, the transmission timing control portion controls in advance the transmission timing for the mobile terminal devices connecting in the path division multiple manner to maximize the transmission timing intervals for the mobile terminal devices connecting in the path division multiple manner in the slot after assignment of the transmission timing for the new mobile terminal device.

Preferably, when any one of the mobile terminal devices is disconnected in the slot, the transmission timing control portion controls the transmission timing of the remaining mobile terminal devices still connecting in the path division multiple manner to provide the maximum transmission timing intervals for the remaining mobile terminal devices.

According to still another aspect of the invention, a transmission timing control method in a radio base station system allowing path division multiple connection of a plurality of mobile terminal devices, and operating to transmit and receive signals to and from the plurality of mobile terminal devices on a basis of a plurality of slots, includes the steps of measuring the number of the mobile terminal devices connected in each of the plurality of slots; operating, for the slot used for the path division multiple connection of a predetermined number or more of the mobile terminal devices, to control transmission timings for the mobile terminal devices connecting in the path division multiple manner within a section allowing the transmission timing setting in the slot and thereby to maximize transmission timing intervals for the mobile terminal devices connecting in the path division multiple manner in the slot; and operating, for the slot used for the path division multiple connection of the mobile terminal devices fewer than the predetermined number, to control the transmission timing for the mobile terminal devices connecting in the path division multiple manner in the slot to ensure a section for assigning the transmission timing for a new mobile terminal device within the section allowing the transmission timing setting in the slot, and to assign the transmission timing for the new mobile terminal device requesting the connection to the ensured section.

Preferably, the step of controlling the transmission timing controls the transmission timing for the mobile terminal devices connecting in the path division multiple manner to configure the slot used for the path division multiple connection of the mobile terminal devices fewer than the predetermined number such that a leading region in the section allowing the transmission timing setting in the slot is always used as a section for assigning the sending timing for a new mobile terminal device.

Preferably, the step of controlling the transmission timing rejects the assignment of the transmission timing for a new mobile terminal device when the new mobile terminal device requests connection during a period of controlling the transmission timing to ensure a section for assigning the transmission timing.

Preferably, when any one of the mobile terminal devices is disconnected in the slot used for the path division multiple connection of the predetermined number or more of the mobile terminal devices, the step of controlling the transmission timing controls the transmission timing for the remaining mobile terminal devices still connecting in the path division multiple manner to provide the maximum transmission timing intervals for the remaining mobile terminal devices.

Preferably, the predetermined number is determined in accordance with a total number of the mobile terminal devices connected in all of the plurality of slots.

Preferably, the step of controlling the transmission timing stops the control of the transmission timing performed for ensuring the section for assigning the transmission timing when the predetermined number changes.

According to yet another aspect of the invention, a transmission timing control method in a radio base station system for allowing path division multiple connection of a plurality of mobile terminal devices, and operating to transmit and receive signals to and from the plurality of mobile terminal devices on a basis of a plurality of slots, includes the steps of measuring the number of the mobile terminal devices connected in each of the plurality of slots; and controlling, within a section allowing transmission timing setting in each of the slots, transmission timing for the mobile terminal devices connecting in the path division multiple manner to maximize transmission timing intervals for the mobile terminal devices connecting in the path division multiple manner in the slot; and assigning the transmission timing for a new terminal device requesting connection to the same slot during a period of communication of the radio base station system to the mobile terminal device over a control channel.

Preferably, the step of controlling the transmission timing controls in advance the transmission timing for the mobile terminal devices connecting in the path division multiple manner to maximize the transmission timing intervals for the mobile terminal devices connecting in the path division multiple manner in the slot after assignment of the transmission timing for the new mobile terminal device.

Preferably, when any one of the mobile terminal devices is disconnected in the slot, the step of controlling the transmission timing controls the transmission timing of the remaining mobile terminal devices still connecting in the path division multiple manner to provide the maximum transmission timing intervals for the remaining mobile terminal devices.

According to the invention, therefore, the transmission timing intervals for the mobile terminal devices of the plurality of users connected in the same time slot can be increased as large as possible so that deterioration of conversation characteristics and crosstalk between the users can be suppressed.

Also, the mobile terminal device can have the appropriate reception timing since the radio base station system has the appropriate transmission timing for the mobile terminal device. Thereby, it is possible to prevent crosstalk in the mobile terminal device between a wave transmitted thereto and a wave transmitted to another device.

BEST MODES FOR CARRYING OUT THE INVENTION

Embodiments of the invention will now be described in greater detail with reference to the drawings. In the drawings, the same or corresponding portions bear the same reference numbers, and description thereof is not repeated.

Figure 1:
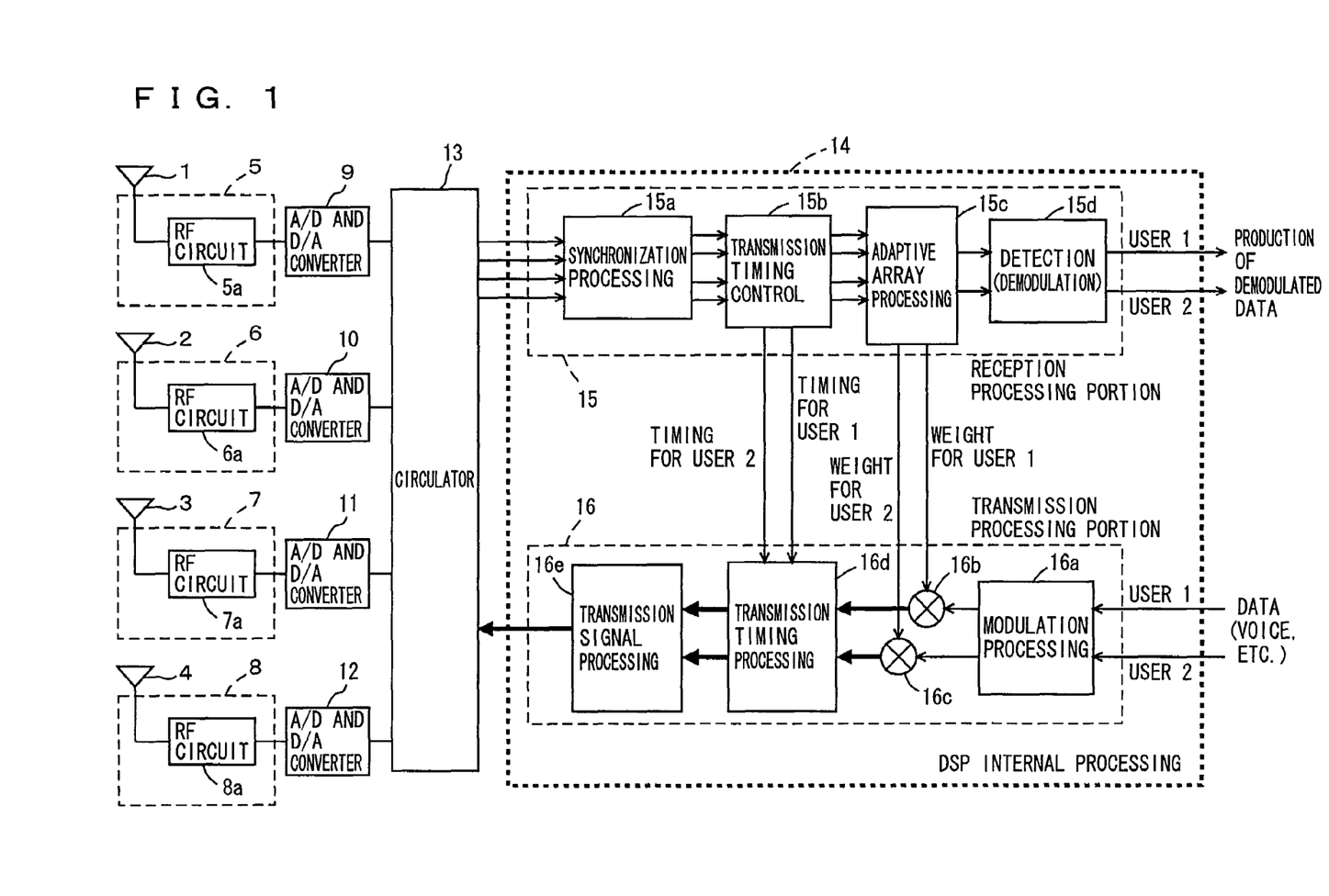
FIG. 1 is a function block diagram showing a whole structure of a radio base station system according to the invention.

FIG. 1 is a function block diagram showing a whole structure of a radio base station system according to the invention.

Referring to FIG. 1, signals transmitted from mobile terminal devices of a plurality of users are received by a plurality of (e.g., four) antennas 1, 2, 3 and 4 of a radio base station system, and are subjected to reception processing by RF circuits 5a, 6a, 7a and 8a of corresponding transmission/reception circuits 5, 6, 7 and 8. Then, the signals are converted into digital signals by A/D and D/A converters 9, 10, 11 and 12.

The four streams of received signals, which are sent from the respective antennas and are converted into the digital signals, are applied to a Digital Signal Processor (DSP) 14 via a circulator 13. Functions to be executed by software in the DSP are illustrated in blocks depicted by dotted line 14 within the DSP.

The four streams of received signals sent to DSP 14 via circulator 13 are applied to a synchronization processing portion 15a of a reception processing portion 15. Based on a known synchronizing position estimating method, synchronization processing portion 15a estimates highly precisely the reception timings of the received signals from the respective terminal devices of a plurality of users' (users 1 and 2 in this example) connecting in the path division multiple manner to this radio base station system.

A transmission timing control portion 15b produces transmission timing control signals for respective users based on the reception timings estimated for respective users, and executes the transmission timing control according to the invention. The transmission timing control according to the invention will be described later in greater detail.

Then, an adaptive array processing portion 15c performs known adaptive array processing on the received signals, and the received signals of users 1 and 2 are separated and extracted with weights calculated for users 1 and 2, respectively.

The signals thus separated and extracted for the respective users are demodulated by a detecting portion 15d, and are output from DSP 14 as demodulated data for users 1 and 2, respectively.

Data (e.g., voice data) to be transmitted for users 1 and 2 are applied to a modulation processing portion 16a of a transmission processing portion 16 of DSP 14. The data for respective users 1 and 2 are modulated by modulation processing portion 16a, and are applied to respective inputs of multiplier 16b and 16c.

Multipliers 16b and 16c receive on respective other inputs the weights of users 1 and 2 calculated by adaptive array processing portion 15c so that the transmission directivities of the data of users 1 and 2 are determined.

The outputs of multipliers 16b and 16c are applied to a transmission timing adjusting portion 16d. Transmission timing adjusting portion 16d adjusts the timings for data transmission for users 1 and 2 based on the control signal for the transmission timing of users 1 and 2 applied from transmission timing control portion 15b, as will be described later.

A transmission signal combining portion 16e combines the transmission signals for users 1 and 2, converts them into four streams of transmission signals represented by an arrow in FIG. 1, and distributes them to A/D and D/A converters 9, 10, 11 and 12 via circulator 13. The four streams of transmission signals converted into analog signals by A/D and D/A converters 9, 10, 11 and 12 are subjected to the transmission processing by RF circuits 5a, 6a, 7a and 8a in transmission/reception circuits 5, 6, 7 and 8, respectively, and are transmitted from corresponding antennas 1, 2, 3 and 4 toward the mobile terminal devices, respectively.

FIRST EMBODIMENT

Figure 2:
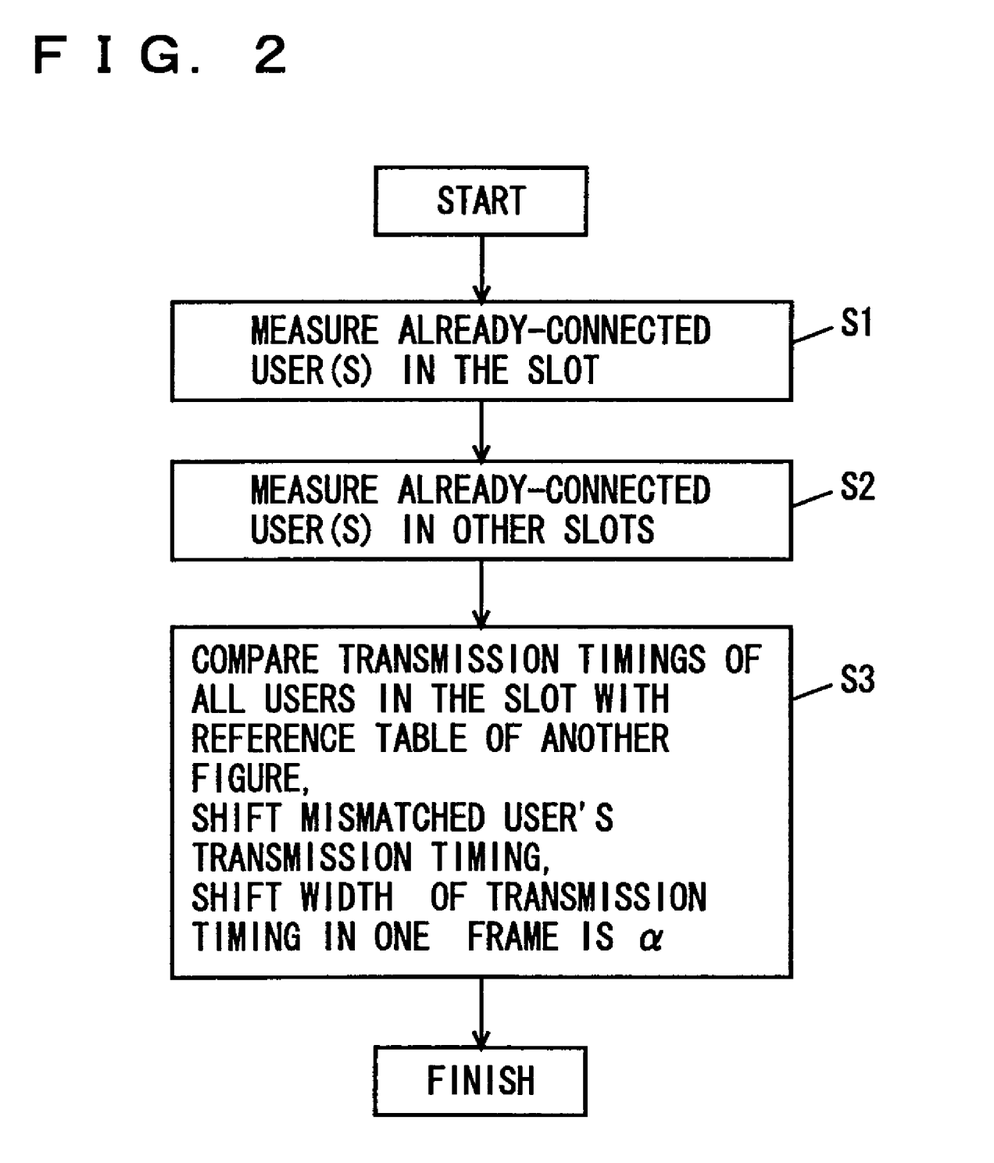
FIG. 2 is a flow chart illustrating basic processing in a transmission timing control method according to a first embodiment of the invention.

FIG. 2 is a flow chart illustrating basic processing of a transmission timing control method according to a first embodiment of the invention. In the first embodiment to be described below, the mobile communication system of, e.g., the PDMA type is configured to allow connection of a new user in a time slot of a low path multiplicity, and not to allow connection of the new user in a time slot of a high path multiplicity.

In the slot of a low path multiplicity, in order to allow the connection of the new user and thus ensure a section for assigning the transmission timing for the new user, it is necessary to narrow in advance the transmission timing intervals for the users already connected in the same slot. However, it can be considered that the possibility of occurrence of the characteristic deterioration already described is low, because the multiplicity is originally low. For the slot having originally a high multiplicity, however, connection of a new (i.e., further) user is not desired in view of the characteristic deterioration. Therefore, the connection of the new user is inhibited, and the transmission timing intervals of the plurality of users already connected in the same slot are increased as large as possible so that the foregoing deterioration of characteristics may be avoided.

In the mobile communication system of, e.g., the PDMA type, an up link (from the mobile terminal device to the radio base station system) and a down link (from the radio base station system to the mobile terminal device) alternatively transmit data in a time-series manner on a basis of four slots, and both have the same format.

Thus, a control channel (which may be referred to as "CCH" hereinafter) signal is assigned to a leading slot 1. Traffic channel (which may be referred to as "TCH" hereinafter) signals are assigned to succeeding three slots 2, 3 and 4, respectively. Control channel signal CCH is used for establishing a traffic (conversation) channel by activating traffic channel TCH.

Referring to FIG. 2, description will now be given on a basic operation of the transmission timing control method according to the first embodiment. In FIG. 2, the DSP (transmission timing control portion 15b in FIG. 1) in the radio base station system executes the processing in steps S1-S3 on each frame of the transmission signal.

First, in step S1, the DSP measures the number of users, who are already in the connected state and thus in the conversation state, in a slot in question among the three slots of the traffic channels.

In next step S2, the DSP measures the number of already-connected users in the other slots among the three slots.

In next step S3, the transmission timings for the already-connected users in the slot in question is shifted based on the numbers of users in the respective slots measured in steps S1 and S2 so that the transmission timings defined in a reference table, which will be described later, may be achieved.

Figure 3:
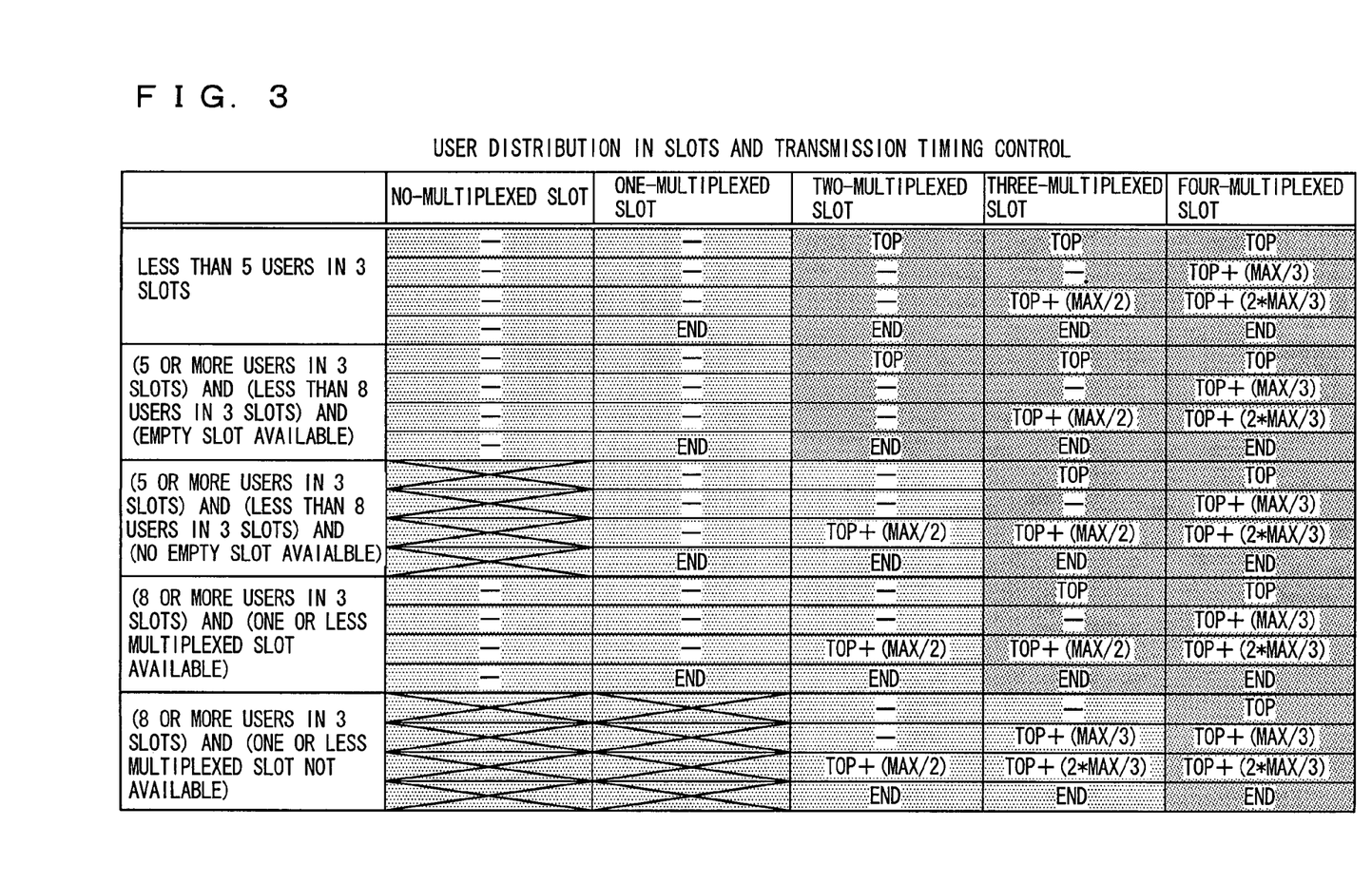
FIG. 3 shows by way of example a reference table described at a step S3 in FIG. 2.

FIG. 3 illustrates by way of example the reference table stated at step S3 in FIG. 2. In FIG. 3, a first row relates to the case, where less than five already-connected user(s) are present in three slots, and represents the timing position of the transmission timing to be determined for each user in each of the slots in no-multiplexed state (no already-connected user), one-multiplexed state (one already-connected user), two-multiplexed state (two already-connected users), three-multiplexed state (three already-connected users) and four-multiplexed state (four already-connected users). The example in FIG. 3 allows up to four-multiplexed state in the three slots.

In each of rows in FIG. 3, each slot is represented by a rectangular frame, of which longitudinal direction represents a time-axis direction. Each rectangular frame represents a section allowing setting of the transmission timing in each slot, and is longitudinally divided into four subsections. In each slot, the top subsection represents a top or leading region in the section allowing the transmission timing setting of the slot, and the bottom subsection represents an end or trailing region in the section allowing the transmission timing setting. The two subsections between the top and bottom subsections represent the timing regions allowing connection by the users between the leading and trailing regions in the section allowing the transmission timing setting.

In FIG. 3, the second row relates to the case, where five, six or seven already-connected users are present in three slots, and an empty slot is also present in three slots, and represents the timing position of the transmission timing to be determined for each user in each of the slots of no-multiplexed state, one-multiplexed state, two-multiplexed state, three-multiplexed state and four-multiplexed state.

In FIG. 3, the third row relates to the case, where five, six or seven already-connected users are present in three slots, and no empty slot is present in three slots, and represents the timing position of the transmission timing to be determined for each user in each of the slots of one-multiplexed state, two-multiplexed state, three-multiplexed state and four-multiplexed state.

In FIG. 3, the fourth row relates to the case, where eight or more already-connected users are present in three slots, and a slot in one or less multiplexed state is present in three slots, and represents the timing position of the transmission timing to be determined for each user in each of the slots of no-multiplexed state, one-multiplexed state, two-multiplexed state, three-multiplexed state and four-multiplexed state.

In FIG. 3, the fifth row represents the case, where eight or more already-connected users are present in three slots, and a slot in one or less multiplexed state is present in the three slots, and represents the timing position of the transmission timing to be determined for each user in each of the slots of two-multiplexed state, three-multiplexed state and four-multiplexed state.

Referring to the reference table of FIG. 3, processing in step S3 of FIG. 2 will now be described in greater detail.

In step S3 of FIG. 2, an operation is performed based on the total number of users in the three slots measured in steps S1 and S2 to determine the current or present case among the cases in the first to fifth rows of the reference table of FIG. 3. Based on the results, the transmission timing for each already-connected user in each time slot is shifted to match with the transmission timing, which is defined in the slot of the multiplicity corresponding to the row determined in the reference table of FIG. 3.

More specifically, it is impossible to predict when a new user will request the connection. Accordingly, it is necessary to ensure in advance a section for assigning the transmission timing for the new user requesting the connection. Otherwise, the transmission timing must be adjusted after the connection is established. This deteriorates the characteristics, although it may be temporary. For ensuring the transmission timing section for the new user, therefore, it is intended to achieve in advance the transmission timing position in FIG. 3.

Also, it is intended to maximize the transmission timing interval between the already-connected users in the slot by inhibiting the connection of the new user if the multiplicity is high in the slot due to increase in number of the already-connected users.

In FIG. 3, each slot with a light background is configured such that a leading region in the section allowing the transmission timing setting is empty, so that connection of a new user can be allowed. Thus, the slot is ready for accepting the new user. Each slot with a dark background is configured such that a leading region in the section allowing the transmission timing setting is not empty, so that connection of the new user can not be allowed. Thus, the slot is not ready for accepting the new user.

In this example, the transmission timing for the new user is generally set in the leading region of the section allowing the transmission timing setting in each slot.

In step S3, processing is performed for the slot in the one-multiplexed state such that the transmission timing for one already-connected user located in the leading region of the section allowing the transmission timing setting in this slot is unconditionally and slowly shifted to the trailing end of the section allowing the transmission timing setting. Thereby, the transmission timing assignment section for the new user is ensured.

A shift width $\alpha$, by which processing in step S3 moves the transmission timing at a time (for one frame), is set to an optimum value in view of various conditions because the mobile terminal device cannot follow width $\alpha$ of an excessively large value in some case, and width $\alpha$ of an excessively small value requires a long time for shifting.

In the slot of the two-multiplexed state, the three-multiplexed state is not be allowed under the conditions at the first or second rows in FIG. 3 even if the connection is requested from a new user. Within the slots in the two-multiplexed state at the first and second rows, the transmission timing for the second-multiplexed user is fixedly kept in the leading region.

Under the conditions in the third to fifth rows of FIG. 3, the slot in the two-multiplexed state is prepared to allow the three-multiplexed state by connection of the new user. For this, the transmission timing of the already-connected user, of which transmission timing is fixed to the leading region of the slot in the two-multiplexed state, is slowly shifted to a position intermediate between the leading and trailing ends of the section allowing the transmission timing setting. In FIG. 3, "MAX" represents a maximum value of the transmission timing interval, and thus represents an interval between the leading and trailing ends of the section allowing the transmission timing setting.

Consequently, when the new user attempts the connection achieving a third multiplexed state, the transmission timing for this user can be assigned to the leading region of the slot in the two-multiplexed state, and the three-multiplexed state is allowed.

When the preparation for the three-multiplexed state is completed, the conditions at the third to fifth rows in FIG. 3 may be no longer satisfied, in which case the preparation for the three-multiplexing is no longer required. This is because the slot in the multiplexed state of the multiplicity lower than two is present, and therefore the new user can connect in such a slot. In this case, the slot in the two-multiplexed state is controlled to return the transmission timing for the second-multiplexed user, which was once shifted to the middle position in the section allowing the transmission timing setting as described above, to the leading position.

Under the conditions in any one of the first to fourth rows of FIG. 3, the three-multiplexed slot does not allow four-multiplexing even if the new user requests the connection. In the three-multiplexed slots in the first to fourth rows, therefore, the transmission timing for the third-multiplexed user is fixedly kept in the leading region.

Under the conditions at the fifth row in FIG. 3, preparation is performed in the three-multiplexed slot for allowing the fourth-multiplexing by the new user. For this, processing is performed in the three-multiplexed slot to shift slowly the transmission timing fixed at the leading and middle regions for the two users among the already-connected three users so that the transmission timing intervals between the three users may be equal to each other. Between the above two-users, the slow shifting is first performed on the user, of which transmission timing is later than the other.

Consequently, when the new user attempts the fourth-multiplexed connection, the transmission timing for the new user can be assigned to the leading region in the three-multiplexed slot so that the four-multiplexed state can be allowed.

When the preparation for the four-multiplexed state is completed, the conditions at the row in FIG. 3 may be no longer satisfied, in which case the preparation for the four-multiplexing is no longer required. This is because the slot in the multiplexed state of a multiplicity lower than two is present, and therefore the new user can connect in such a slot. In this case, the slot in the three-multiplexed state is controlled to return the transmission timing for the two users, which was once shifted to provide equal transmission timing intervals as described above, to the original or initial positions, respectively. Between the two users, slow shifting is first performed on the user, of which transmission timing is earlier than the other.

In the processing at step S3, control is performed to reject the assigning of the transmission timing if the new user requests the connection during the preparation for the connection by the new user, i.e., during the shifting of the transmission timing of the already-connected user according to the table in FIG. 3.

According to the transmission timing control method of the first embodiment shown in FIGS. 2 and 3, the preparation for the multiplexed connection of the new user is performed in the slot of a low multiplicity by narrowing the transmission timing intervals for the already-connected users. In the slot of a high multiplicity, however, the transmission timing intervals for the already-connected users are kept as large as possible, and thereby the preparation for the multiplexed connection of the new user is not performed. Consequently, it is possible to provide the slot prepared for the new user while keeping the transmission timing intervals as large as possible.

As already described, the time relationship between the reception timing and the transmission timing of the mobile terminal device is defined in advance. Therefore, by providing the appropriate transmission timing for the mobile terminal devices in the radio base station system, it is possible to provide the appropriate reception timing in the mobile terminal device.

The conditions on the number of users with respect to the number of slots are defined at the first to fifth rows in the table of FIG. 3 as already described, and these conditions are appropriately determined in accordance with a balance between demands for increasing the transmission timing interval and demands for increasing the number of the slot(s) prepared for the new user(s).

SECOND EMBODIMENT

FIGS. 4A-4D are timing charts for illustrating basic operation principles of the transmission timing control method according to a second embodiment of the invention. In the first embodiment already described, the transmission timing intervals between the users are narrowed, for example, in the slot, which is in the two-multiplexed state and is already ready for the new user.

In the second embodiment to be described below, the mobile communication system, e.g., of the PDMA type is configured to shift the transmission timing for the new user while the radio base station system is communicating with the mobile terminal device over the control channel, and thereby the transmission timing intervals for the already-connected users can be maximized during the traffic (conversation) channel communication.

Figure 4A:
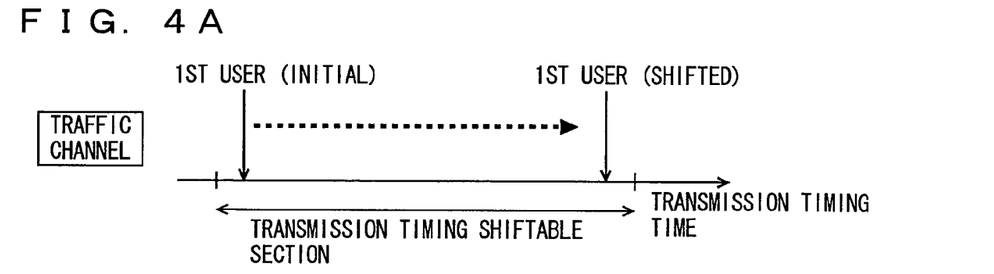
FIGS. 4A, 4B, 4C and 4D are timing charts illustrating basic operation principles of the transmission timing control method according to a second embodiment of the invention.

Referring to FIG. 4A, a first-multiplexed user of the transmission timing, which is assigned to the leading position in the section allowing the transmission timing setting within the slot, is shifted to the trailing end in the section allowing the transmission timing setting during the period of the traffic channel.

Figure 4B:
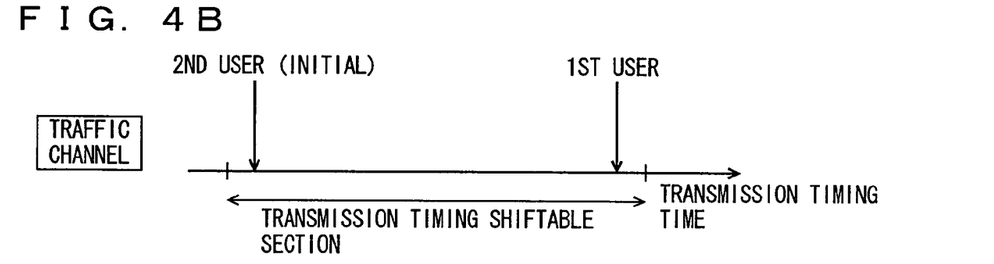

Referring to FIG. 4B, the transmission timing for the second-multiplexed user is assigned to the leading position in the section allowing the transmission timing setting of the slot during the period of the traffic channel. Thereby, the transmission timing interval in the two-multiplexed state can be increased as large as possible.

For the user requesting the new connection by the third-multiplexing, the transmission timing control is executed as follows. The transmission timing is shifted while the signal is transmitted over the control channel between the radio base station system and the mobile terminal device (see FIG. 4C) so that the transmission timing is located at a middle position in the section allowing the transmission timing setting when the traffic channel is established (see FIG. 4D).

Consequently, the transmission timing intervals during the traffic channel can be increased to the maximum extent. Further, at the time of connection of the new user, the optimum transmission timing can be achieved from the start of establishment of the traffic channel after the end of the control channel.

Figure 4C:
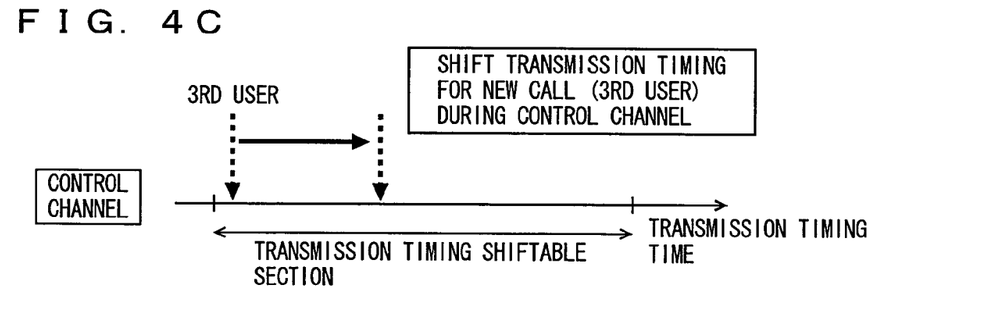
Figure 4D:
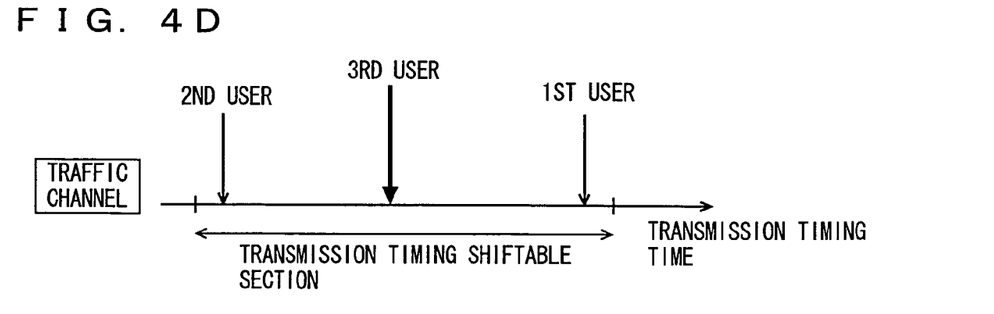
Figure 5:
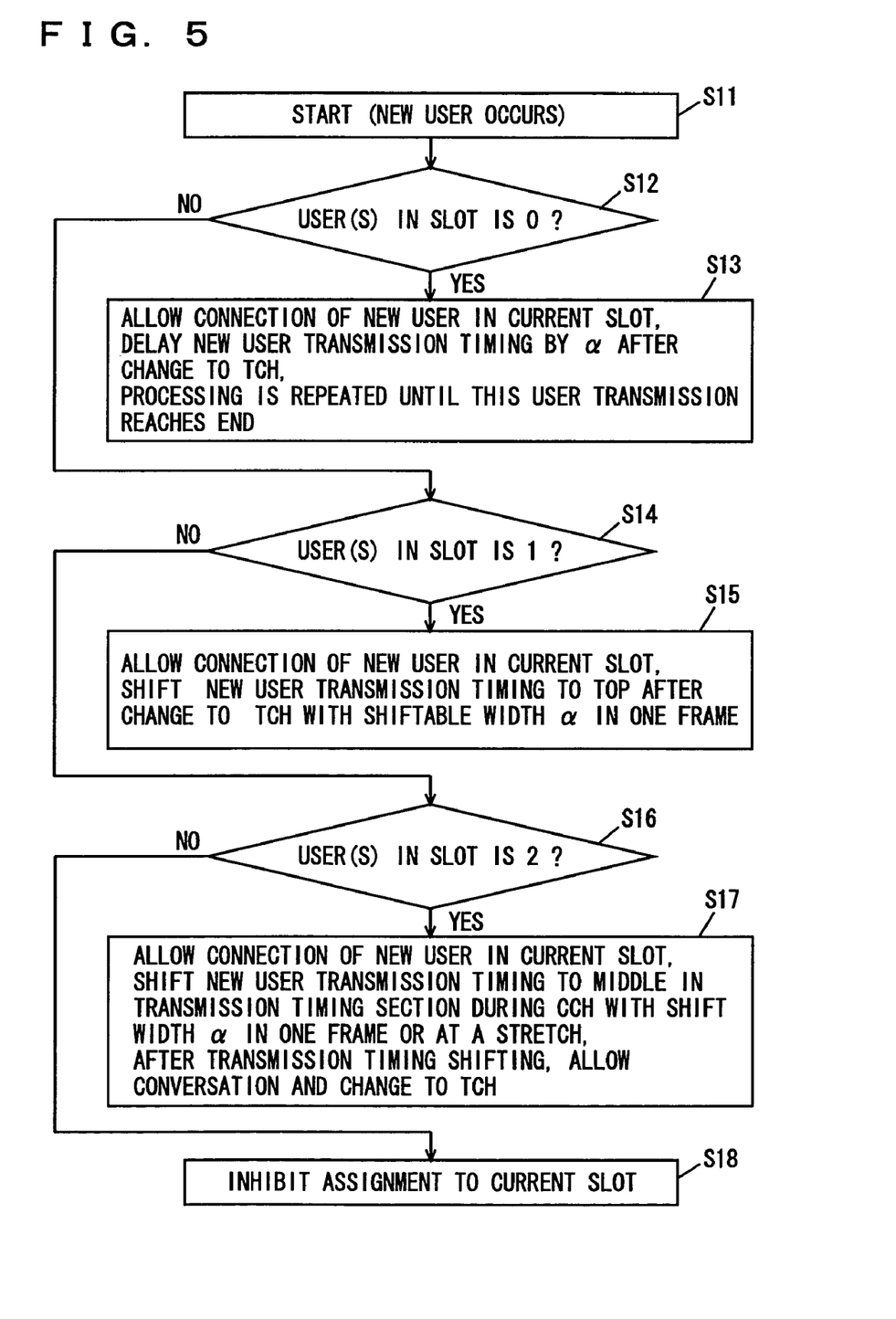
FIG. 5 is a flow chart illustrating basic processing of the transmission timing control method of the second embodiment illustrated in FIGS. 4A-4D.

FIG. 5 is a flow chart illustrating basic processing of the transmission timing control method of the second embodiment illustrated in FIGS. 4A-4D. The processing illustrated in FIG. 5 relates to the case where each slot allows up to three multiplexing, and is executed for each frame of the transmission signal by the DSP (transmission timing control portion 15$b$ in FIG. 1) of the radio base station system.

When the connection request by the new user occurs in a step S11, the DSP operates in a step S12 to measure the number of the already-connected users in the current slot.

When it is determined in step S12 that the number of the already-connected user is equal to zero, the connection of the new user (first multiplexing) in the current slot is allowed in a step S13, and the transmission timing is delayed by predetermined shift width α for each frame after change to the traffic channel (TCH). This processing is performed until the transmission timing reaches the trailing end as illustrated in FIG. 4A.

Conversely, when it is determined in step S12 that the already-connected user(s) is not zero, it is determined in a step S14 whether the already-connected user(s) is one or not. If it is one, processing in a step S15 is performed to allow the connection of the new user (second multiplexing) in the current slot, and the transmission timing for the new user is assigned to the leading position after change to the traffic channel as shown in FIG. 4B.

Conversely, when it is determined in step S14 that the already-connected user(s) is not one, it is determined in a step S16 whether the already-connected user(s) are two or not. If the users are two, processing in a step S17 is performed to allow the connection of the new user (third multiplexing) in the current slot, and the transmission timing for the new user is moved to a middle position in the section allowing the transmission timing setting during the control channel (CCH) as shown in FIG. 4C. After this shifting, and the traffic channel (TCH) is established (FIG. 4D).

When it is determined in step S16 that the already-connected users are not equal to two, this means that the multiplexing of three of more is already present. This example allows the multiplexing of up to three, connection in the current slot is inhibited in a step S18.

Since the period of the control channel is short, the shift width α for each frame must be relatively large.

FIGS. 4A-4D and FIG. 5 show the case where the multiplexing of up to three is allowed. In contrast to this, FIG. 6 is a timing chart illustrating procedures of the transmission timing control in the case where the multiplexing of up to four is allowed.

Figure 6:
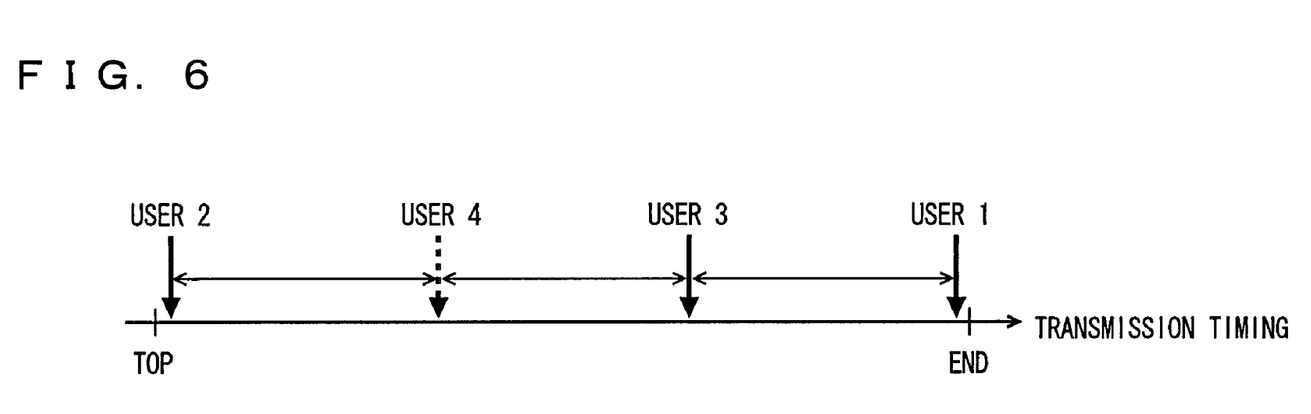
FIG. 6 is a timing chart illustrating a procedure of the transmission timing control in the case allowing up to four-multiplexing according to the second embodiment.

Referring to FIG. 6, for allowing the multiplexing of up to four, the transmission timing for a third-multiplexed user 3 is delayed in advance for the preparation of connection of a fourth user 4, and the transmission timing of user 4 is shifted to a position intermediate between those for users 2 and 3 during the period of the control channel. When the traffic channel is established, the optimum transmission timing intervals are provided for the four-multiplexed users from the start of the traffic channel.

According to the transmission timing control method of the second embodiment illustrated in FIGS. 4A to 6, as described above, the transmission timing intervals for the already-connected users are kept as large as possible during the traffic channel for preventing the deterioration of characteristics, and the assignment of the transmission timing for the new user is performed during the control channel so that the optimum transmission timing intervals can be achieved when the traffic channel is established.

Similarly to the first embodiment already described, the mobile terminal device can have the appropriate reception timing since the radio base station system has the appropriate transmission timing for the mobile terminal device.

THIRD EMBODIMENT

In either of the foregoing embodiments 1 and 2, the users connecting in the path division multiple manner in a certain slot may decrease in number due to interference activation or abnormal disconnection. A third embodiment of the invention is configured to expand the transmission timing by further shifting the send time when the above situation occurs in the first or second embodiment.

FIGS. 7A-7D are timing charts illustrating the basic operation principles of the transmission timing control method of the third embodiment of the invention.

Figure 7A:
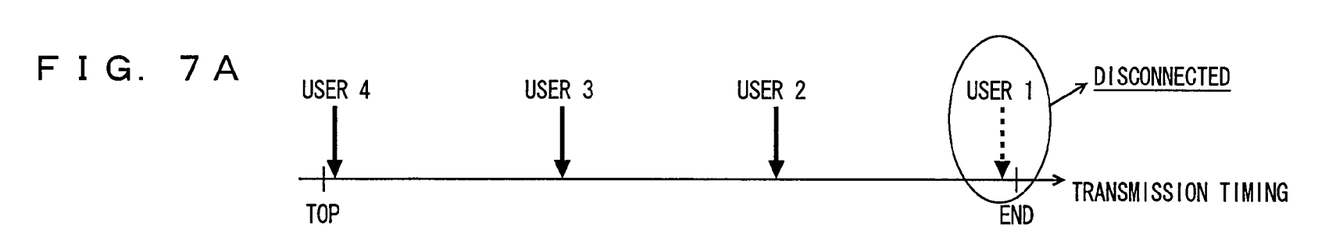
FIGS. 7A-7D are timing charts illustrating basic operation principles of the transmission timing control method according to a third embodiment of the invention.

Referring to FIG. 7A, it is assumed that the users 1-4 are in the four-multiplexed state, and user 1 is disconnected due to a certain reason. In this case, the transmission timing is shifted to expand the transmission timing intervals of the remaining users.

Figure 7B:
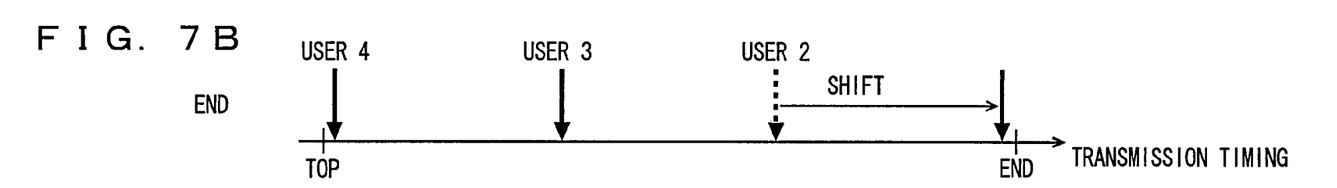

For the above expansion, the transmission timing for user 2, which is close to the trailing end of the section allowing the transmission timing setting, is first shifted to the trailing end (see FIG. 7B).

Figures 7C, 7D:
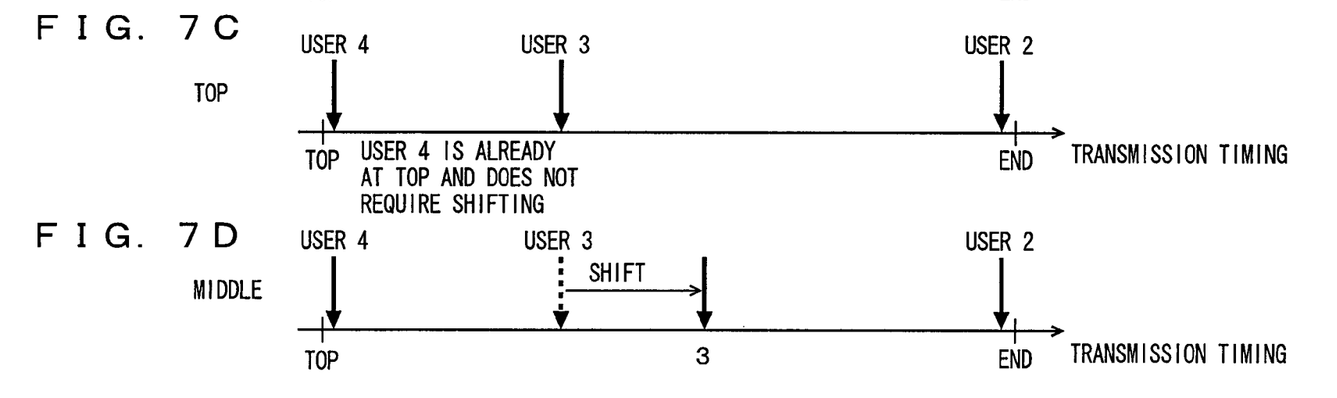

Since the transmission timing for user 4 is already located at the leading position, it is not necessary to shift it (see FIG. 7C), and the transmission timing for user 3 is shifted to a middle position in the section allowing the transmission timing setting (see FIG. 7D). Thereby, the transmission timing intervals of the remaining users can be expanded to the maximum extent.

Figure 8:
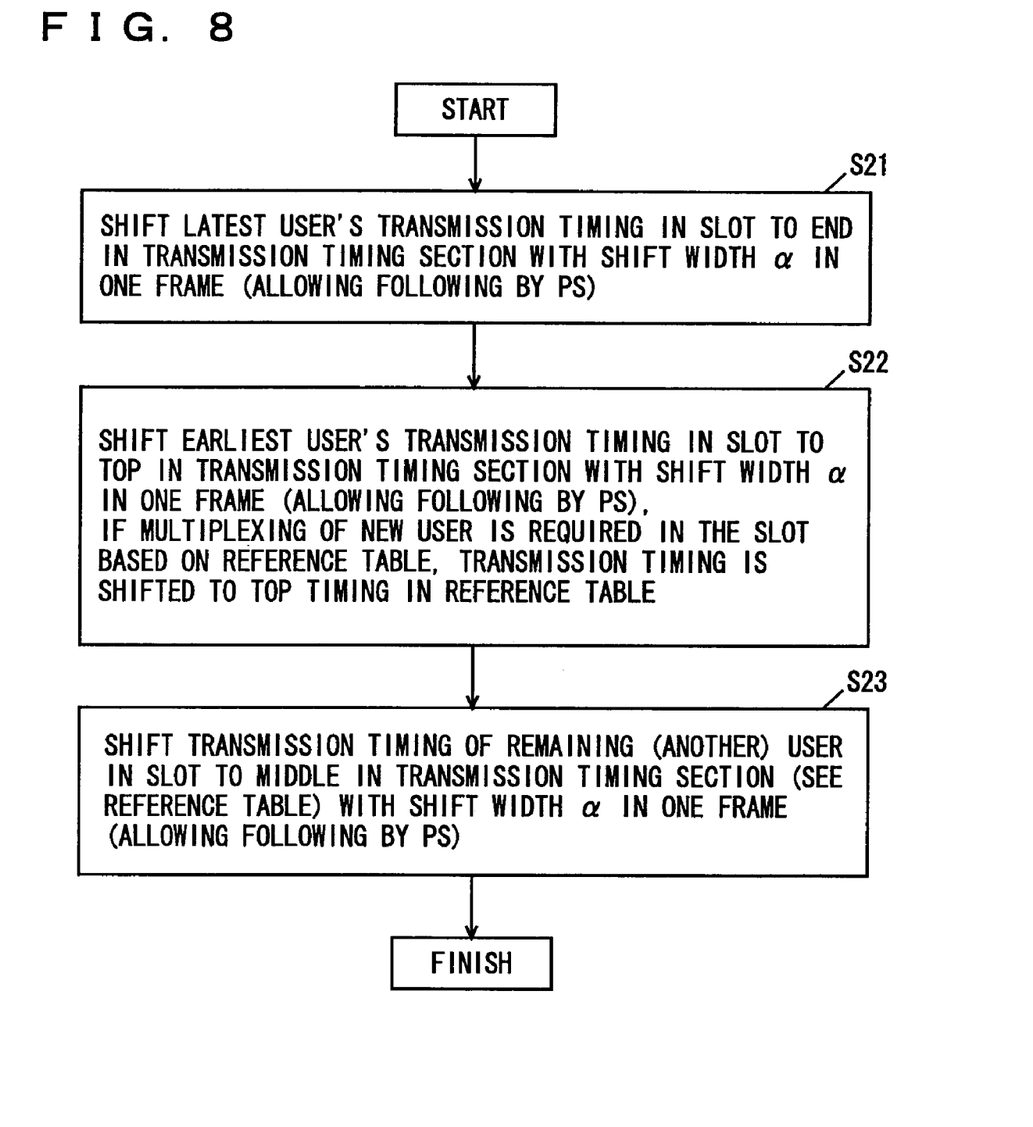
FIG. 8 is a flow chart illustrating basic processing of the transmission timing control method according to the third embodiment illustrated in FIGS. 7A-7D.

FIG. 8 is a flow chart showing the basic processing of the transmission timing control method of the third embodiment shown in FIGS. 7A-7D. The processing in FIGS. 7A-7D is executed for each frame of the transmission signal by the DSP of the radio base station system.

When one of the users is disconnected, the transmission timing for the user of the latest transmission timing in the same slot is shifted to the trailing position in the section allowing the transmission timing setting in a step S21 (see FIG. 7B). It is assumed that the shift width for each frame in each of subsequent steps is set to a value α in a range, which can be followed by the mobile terminal device.

In a next step S22, the transmission timing of the user of the earliest transmission timing in the same slot is shifted to the leading position in the section allowing the transmission timing setting (FIG. 7C). If this manner is applied to the first embodiment, the transmission timing is shifted to the leading transmission timing defined in the reference table (FIG. 3).

Finally, the transmission timing for another user remaining in the slot is moved to the middle position in the section allowing the transmission timing setting (FIG. 7D). If this manner is applied to the first embodiment, the transmission timing is shifted to the transmission timing defined in the reference table (FIG. 3).

According to the third embodiment of the invention, as described above, even if the multiplexed users decrease in number, the transmission timing is readjusted so that the transmission timing intervals can always be expanded as large as possible.

Similarly to the first and second embodiments already described, the mobile terminal device can have the appropriate reception timing since the radio base station system has the appropriate transmission timing for the mobile terminal device.

According to the invention, as described above, the slot of a low multiplicity is processed to narrow the transmission timing intervals for the already-connected users and thereby to make preparation for the new user. However, the slot of a high multiplicity is processed to keep the maximum transmission timing intervals for the already-connected users, and the preparation for the new user is not performed. As a result, it is possible to provide the slot prepared for the new user while maximizing the transmission timing intervals.

According to the invention, the mobile terminal device can have the appropriate reception timing since the radio base station system has the appropriate transmission timing for the mobile terminal device. Thereby, it is possible to prevent crosstalk in the mobile terminal device between a wave transmitted thereto and a wave transmitted to another device.

According to the invention, the transmission timing intervals for the already-connected users are kept as large as possible during the traffic channel for preventing the deterioration of characteristics, and the shifting of the transmission timing is performed for the new user during the control channel so that the optimum transmission timing intervals can be achieved when the traffic channel is established.

Even if the multiplexed users decrease in number, the transmission timing is readjusted so that the transmission timing intervals can always be expanded as large as possible.

INDUSTRIAL APPLICABILITY

In the radio base station system and the transmission timing control method according to the invention, as described above, the maximum transmission timing intervals can be ensured for the mobile terminal devices of the plurality of users connecting in the path division multiple manner in the same time slot so that the deterioration of conversation characteristics and the crosstalk between users can be prevented. Therefore, the invention can be effectively employed in the mobile communication system for improving the conversation characteristics.

The invention claimed is:

1. A radio base station system for allowing path division multiple connection of a plurality of mobile terminal devices, and operating to transmit and receive signals to and from said plurality of mobile terminal devices on a basis of a plurality of slots, comprising:

a measuring portion for measuring the number of the mobile terminal devices connected in each of said plurality of slots; and a transmission timing control portion for operating, for the slot used for the path division multiple connection of a predetermined number or more of the mobile terminal devices, to control transmission timings for the mobile terminal devices connecting in the path division multiple manner within a section allowing the transmission timing setting in the slot to maximize transmission timing intervals for the mobile terminal devices connecting in the path division multiple manner in the slot, and operating, for the slot used for the path division multiple connection of the mobile terminal devices fewer than said predetermined number, to control the transmission timing for the mobile terminal devices connecting in the path division multiple manner in the slot to ensure a section for assigning the transmission timing for a new mobile terminal device within the section allowing the transmission timing setting in the slot, and to assign the transmission timing for the new mobile terminal device requesting the connection to said ensured section.

2. The radio base station system according to claim 1, wherein said transmission timing control portion controls the transmission timing for the mobile terminal devices connecting in the path division multiple manner to configure the slot used for the path division multiple connection of the mobile terminal devices fewer than said predetermined number such that a leading region in the section allowing the transmission timing setting in the slot is always used as a section for assigning the transmission timing for a new mobile terminal device.

3. The radio base station system according to claim 1, wherein said transmission timing control portion rejects the assignment of the transmission timing for a new mobile terminal device when said new mobile terminal device requests connection during a period of controlling the transmission timing to ensure a section for assigning said transmission timing.

4. The radio base station system according to claim 1, wherein, when any one of the mobile terminal devices is disconnected in the slot used for the path division multiple connection of said predetermined number or more of the mobile terminal devices, said transmission timing control portion controls the transmission timing for the remaining mobile terminal devices still connecting in the path division multiple manner to provide the maximum transmission timing intervals for said remaining mobile terminal devices.

5. The radio base station system according to claim 1, wherein
said predetermined number is determined in accordance with a total number of the mobile terminal devices connected in all of said plurality of slots.

6. The radio base station system according to claim 5, wherein
said transmission timing control portion stops the control of the transmission timing performed for ensuring the section for assigning said transmission timing when said predetermined number changes.

7. A transmission timing control method in a radio base station system allowing path division multiple connection of a plurality of mobile terminal devices, and operating to transmit and receive signals to and from said plurality of mobile terminal devices on a basis of a plurality of slots, comprising the steps of:
measuring the number of the mobile terminal devices connected in each of said plurality of slots; and
operating, for the slot used for the path division multiple connection of a predetermined number or more of the mobile terminal devices, to control transmission timings for the mobile terminal devices connecting in the path division multiple manner within a section allowing the transmission timing setting in the slot to maximize transmission timing intervals for the mobile terminal devices connecting in the path division multiple manner in the slot, and operating, for the slot used for the path division multiple connection of the mobile terminal devices fewer than said predetermined number, to control the transmission timing for the mobile terminal devices connecting in the path division multiple manner in the slot to ensure a section for assigning the transmission timing for a new mobile terminal device within the section allowing the transmission timing setting in the slot, and to assign the transmission timing for the new mobile terminal device requesting the connection to said ensured section.

8. The transmission timing control method according to claim 7, wherein
said step of controlling the transmission timing controls the transmission timing for the mobile terminal devices connecting in the path division multiple manner to configure the slot used for the path division multiple connection of the mobile terminal devices fewer than said predetermined number such that a leading region in the section allowing the transmission timing setting in the slot is always used as a section for assigning the sending timing for a new mobile terminal device.

9. The transmission timing control method according to claim 7, wherein
said step of controlling the transmission timing rejects the assignment of the transmission timing for a new mobile terminal device when said new mobile terminal device requests connection during a period of controlling the transmission timing to ensure a section for assigning said transmission timing.

10. The transmission timing control method according to claim 7, wherein,
when any one of the mobile terminal devices is disconnected in the slot used for the path division multiple connection of said predetermined number or more of the mobile terminal devices, said step of controlling the transmission timing controls the transmission timing for the remaining mobile terminal devices still connecting in the path division multiple manner to provide the maximum transmission timing intervals for said remaining mobile terminal devices.

11. The transmission timing control method according to claim 7, wherein
said predetermined number is determined in accordance with a total number of the mobile terminal devices connected in all of said plurality of slots.

12. The transmission timing control method according to claim 11, wherein
said step of controlling the transmission timing stops the control of the transmission timing performed for ensuring the section for assigning said transmission timing when said predetermined number changes.

* * * * *